United States Patent [19]

Chaban

[11] Patent Number: 4,687,913
[45] Date of Patent: Aug. 18, 1987

[54] MICROSCOPE AUTOFOCUS SYSTEM

[75] Inventor: Richard J. Chaban, Ventura, Calif.

[73] Assignee: Warner Lambert Technologies, Inc., Morris Plains, N.J.

[21] Appl. No.: 801,544

[22] Filed: Nov. 25, 1985

[51] Int. Cl.[4] .................. G01J 1/20; G02B 21/06
[52] U.S. Cl. ............................. 250/201; 350/527
[58] Field of Search .................. 250/201 AF; 354/402-409; 350/523, 527

[56] References Cited

U.S. PATENT DOCUMENTS 3,721,827  3/1973  Reinheimer .............. 250/201 AF
4,406,526  9/1983  Smith ...................... 350/527 X
4,447,717  5/1984  Nohda ..................... 250/201 AF Primary Examiner—Eugene R. LaRoche
Assistant Examiner—David Mis
Attorney, Agent, or Firm—Alan H. Spencer

[57] ABSTRACT

An autofocus mechanism for a microscope comprises an arrangement of optical elements aligned along a single optical path. The arrangement includes a single illumination source which provides both a viewing component and a positioning component. Included in the autofocus arrangement are optical elements to eccentrically reference the positioning component for determining the focus condition of the instrument. The autofocus arrangement also includes a detector for determining the degree of eccentricity of the measuring ray and to make adjustments in the microscope according to this eccentricity to bring the viewed object into focus.

18 Claims, 7 Drawing Figures

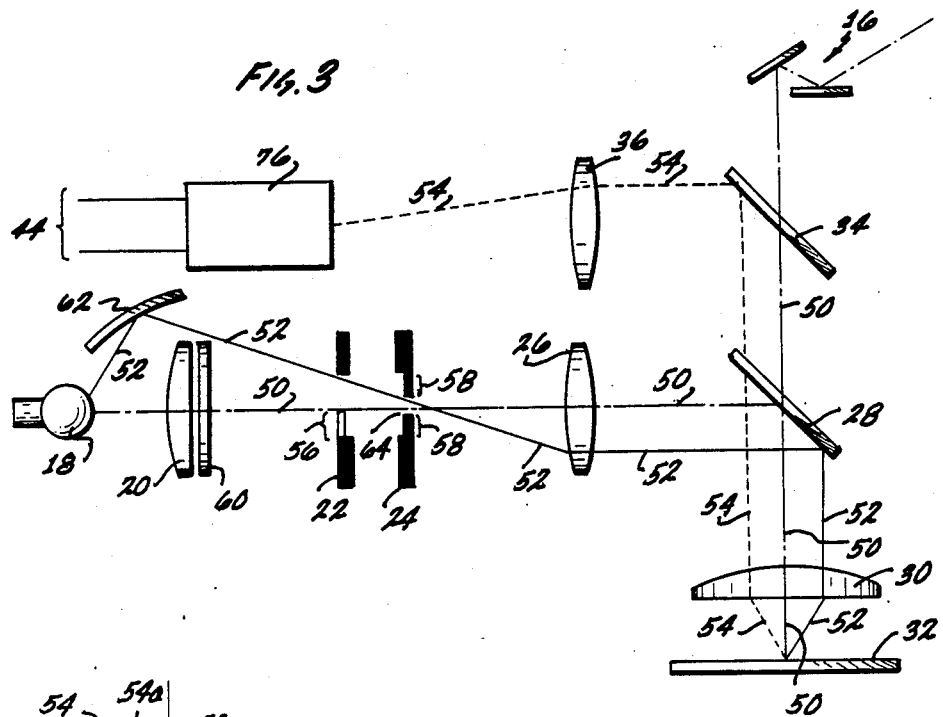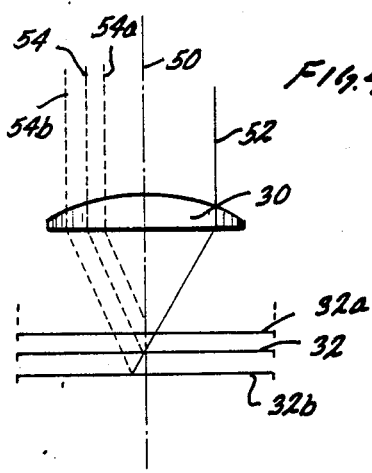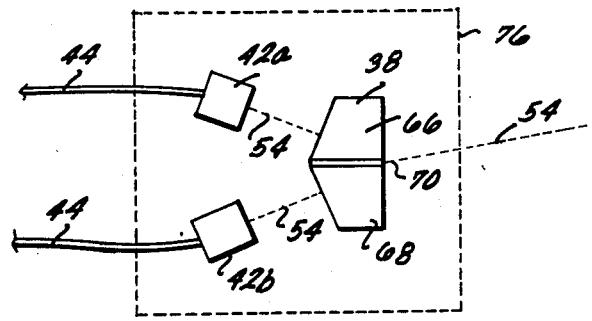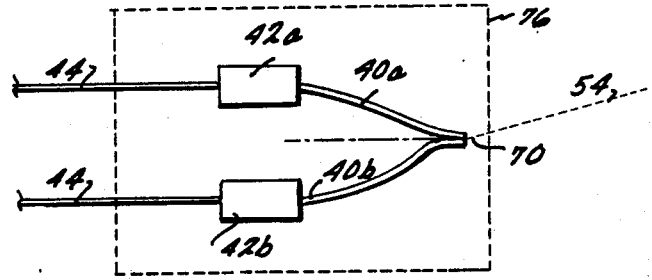

MICROSCOPE AUTOFOCUS SYSTEM

BACKGROUND OF THE INVENTION

This invention relates generally to optical autofocusing arrangements. More specifically, the present invention pertains to an autofocusing arrangement for an optical instrument having a single light source which beams both viewing rays and positioning rays along a single optical path on which the positioning rays are eccentrically indexed for determining the focus condition of the instrument. This invention is particularly, though not exclusively, useful in microscopes.

DESCRIPTION OF THE PRIOR ART

Various proposals have been made to provide means for the automatic focus of microscopes and other optical instruments. Of these various proposals, several have specifically used information contained within the light rays for the purpose of focusing the instrument. For example, U.S. Pat. No. 3,967,110 to Rogers et al. discloses an automatic focusing system for an optical instrument which focuses the instrument according to the intensity of the light received at a detector. Based on a different theory, U.S. Pat. No. 3,721,827 to Reinheimer discloses an autofocusing system in which a measuring ray of invisible light is eccentrically referenced and its deviations detected for focusing the optical instrument. More specifically, the Reinheimer patent discloses such a system in two generally distinct autofocus arrangements for a microscope. In one arrangement, the positioning rays and the viewing rays originate from separate illumination sources, while in the other arrangement a single illumination source is disclosed. In the single illumination source arrangement, however, the measuring rays are reflected out of the illuminating beam and marked for eccentricity along the optical axis before being reflected back into the illuminating beam.

Unlike the prior art, the present invention appreciates that an autofocus arrangement can be structured with only a single illumination source for both the viewing and the measuring rays and that all elements of the arrangement can be confined to a single optical axis. Specifically, the present invention has recognized that even with a single illumination source, a measuring ray can be eccentrically indexed on the optical path to determine the focus condition of the instrument without an unacceptable degradation of the measuring ray.

Accordingly, it is an object of the present invention to simplify the construction of an autofocusing arrangement by reducing the number of required elements to optimize space requirements. It is yet another object of the present invention to provide an autofocus device for a microscope which uses a single light source for both the viewing rays and the measuring rays and which eccentrically indexes the measuring rays along the optical path. Still another object of the present invention is to provide a reliable, relatively inexpensive and cost effective autofocusing device for a microscope.

SUMMARY OF THE INVENTION

According to the present invention, an optical instrument for viewing an object with an objective lens is provided with an arrangement for automatically focusing the instrument on the object being viewed. The arrangement comprises the usual optical elements aligned along an optical axis. In sequence, these elements are a condenser or collector lens, an aperture stop, a field stop, a collimating lens, a beam splitter and the objective lens. The present invention further contemplates appropriate filters positioned at the aperture stop and the field stop to eccentrically align and index a component of the illuminating beam to provide means for determining the focusing condition of the optical instrument.

The optical instrument autofocus arrangement of the present invention further comprises a differential photo detector positioned to receive the indexed component of invisible light after it is reflected from the object being viewed. The focus condition of the instrument is then determined by detecting the position of the reflected index relative to a predetermined reference established by the photo detector. As contemplated by the present invention, the photo detector comprises an image splitter which deverts the eccentrically indexed component toward a first photomultiplier tube when the object plane is above the focal plane and deverts the eccentrically indexed component toward a second photomultiplier tube when the object plane lies below the focal plane. The autofocus arrangement of the present invention also comprises means for adjusting the object plane according to signals from the first and second photomultiplier tubes to cause movement of the index onto the reference and bring the object into focus. Thus, with the index incident on the reference, which occurs when a portion of the index is deviated to each photomultiplier tube, a focused condition for the optical instrument is indicated. In a different arrangement of elements for the photo detector, the ends of two optical fibers may be juxtaposed to establish the reference and their opposite ends connected directly to the respective photomultiplier tubes. With this arrangement the image splitter may be eliminated.

In an alternate embodiment of the present invention, it is envisioned that an off axis elliptical reflector may be employed with the illumination source to provide a greater concentration of light energy from the illumination source.

In still another embodiment of the present invention, a reflector having both an infrared reflector section and an infrared transmissive section can be used to establish an off axis infrared component along the optical axis. In accordance with the disclosure of the present invention, this off axis infrared component can be indexed to focus the microscope.

The novel features of this invention, as well as the invention itself, both as to its organization and operation will be best understood from the accompanying drawings taken in conjunction with the accompanying description in which similar reference characters refer to similar parts and in which:

BRIEF DESCRIPTION OF THE DRAWINGS

FIG. 3 shows a schematic of an alternate embodiment of the present invention incorporating an off axis elliptical reflector and shows the path of an illuminating ray;

FIG. 4 illustrates an objective lens and the effect on the measuring ray caused by changes in position of the object plane along the optical axis;

FIG. 5 is a schematic of an arrangement for elements of the photo detector of the present invention;

FIG. 6 is a schematic of an alternate arrangement for elements of the photo detector of the present invention.

DESCRIPTION OF THE PREFERRED EMBODIMENT

Figure 1:
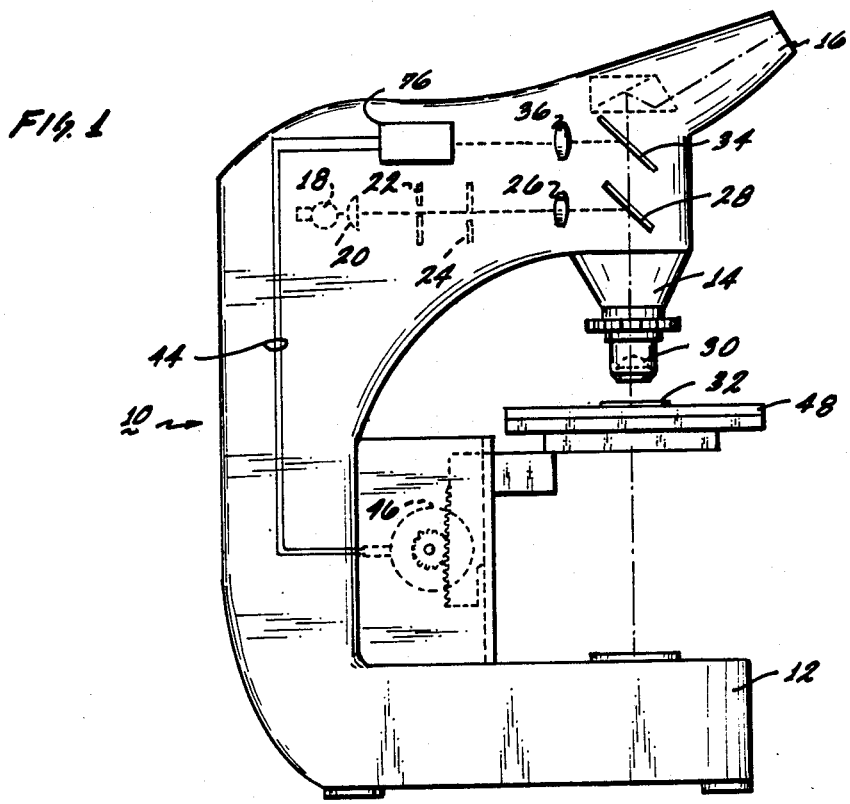
FIG. 1 shows a microscope which incorporates the present invention.

Referring now in detail to the drawings, the autofocus arrangement of the present invention is shown in FIG. 1 in its relationship to a microscope generally designated 10. The microscope 10 comprises a base 12, a nosepiece 14, an eyepiece 16 and a stage 48. As will be more clearly understood subsequently, the autofocus arrangement of the present invention operates so that whenever object 32 is out of focus, an error signal is generated by a photo detector 76 which is transmitted by way of circuitry 44 to a motor 46 for movement of stage 48 in a manner which eliminates the error signal and brings the object 32 into focus.

Figure 2:
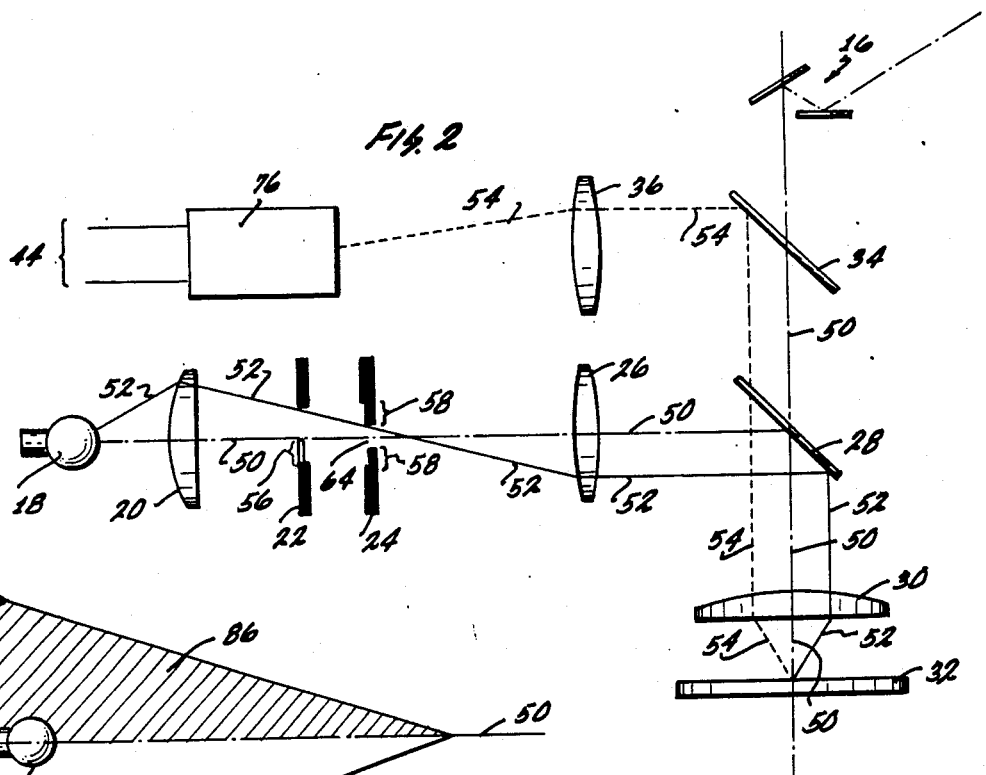
FIG. 2 shows a schematic of a preferred embodiment of the present invention and illustrates the path of an illuminating ray.

The structure and operation of the present invention will be best understood with reference to FIG. 2 in which an illumination source 18 is associated with the microscope 10 to provide incident light or vertical illumination for the object 32 being viewed. Located sequentially along the optical axis 50 in the usual manner is a condenser or collector lens 20, an aperture stop 22, a field stop 24, collimating lens 26, a beam splitter 28 and the objective 30. As will be appreciated by the skilled artisan, if the system is not infinitely corrected, the collimating lens 26 can be eliminated. As will be further appreciated by those skilled in the art, the component of light used as measuring or positioning rays coming from light source 18 can be confined to a portion of the optical path by a filter 56 located at the aperture stop 22. It is understood that this can be done without affecting the viewing component of illuminating ray 52. In the preferred embodiment, filter 56 is selected to restrict the positioning component of illuminating ray 52 to not more than half of the ray 52 and confine this positioning component to one side of the optical axis 50.

After the positioning component of illuminating ray 52 has been eccentrically aligned in the optical path 50 by filter 56 at aperture stop 22, it can be further confined by an occluder 58 at field stop 24 to establish an index 64. Again, this is done without affecting the viewing component of illuminating ray 52. Once established, index 64 is an effective positioning ray whose deviations in eccentricity, i.e. its off axis distance, from optical axis 50 can be used to focus microscope 10. The index 64 may be of any desired cross-section. For example, it could be a pin hole, a slit, a square, a cross or any other configuration having a relatively small cross-section which meets the needs and the desires of the operator.

Once index 64 is established, illuminating ray 52 with index 64 passes through collimating lens 26 and then along optical axis 50 to beam splitter 28 where they are both reflected toward objective 30. Upon passing through objective 30, they are directed onto the object 32. As shown in FIG. 2, illuminating ray 52 and index 64 are reflected from object 32 back through objective 30 as a reflected ray 54. It must be appreciated that reflected ray 54 contains index 64. After passing through objective 30, reflected ray 54 and its component index 64 pass along optical axis 50 through beam splitter 28 toward beam splitter 34. At beam splitter 34, the positioning component of light which has been formed as index 64 is reflected toward lens 36 while the viewing component of reflected ray 54 continues along optical axis 50 to eyepiece 16. After being reflected by mirror 34, index 64 passes through lens 36 and is caused to impinge upon a photo detector 76.

FIG. 4 shows what can happen to illuminating ray 52 and its component index 64 after passing through objective 30. As seen in FIG. 4, reflected ray 54 is passed along a particular path depending upon the distance between objective 30 and object 32. For example, as object 32 is raised to the position indicated 32a, the path of reflected ray 54 will change from the path indicated 54 to the path indicated 54a. Likewise, if object 32 is lowered to the position indicated 32b, reflected ray 54 will move from the path indicated 54 to the path indicated 54b. With an appreciation of the optics shown in FIG. 4, it will be understood that illuminating ray 52 is reflected along a particular path 54, 54a or 54b according to the location of the object 32, 32a or 32b. This fact, as will be appreciated by the skilled artisan, is used to advantage in the present invention for the purpose of focusing microscope 10.

As is best seen in FIG. 5, in the preferred arrangement of elements for photo detector 76, the detector 76 includes an image splitter 38 which diverts reflected ray 54 toward either photomultiplier tube 42a or 42b depending on where ray 54 is incident on image splitter 38. More specifically, image splitter 38 comprises prisms 66 and 68 which are juxtaposed to define a reference 70 at their interface. If ray 54 is incident on prism 66, it will be diverted to photomultiplier tube 42a. If ray 54 is incident on prism 68, it will be diverted to photomultiplier tube 42b. In either case, when index 64 is incident on only prism 66 or on only prism 68, an out-of-focus condition for microscope 10 is indicated. It follows that a focused condition for microscope 10 is indicated when reflected ray 54 is incident on reference 70.

To be even more precise, it is recognized that with image splitter 38, it is possible that reference 70 may be infinitesimally small and that index 64 may therefore be simultaneously incident on reference 70, prism 66 and prism 68. In such a case, a focused condition is indicated when prisms 66 and 68 simultaneously excite photomultiplier tubes 42a and 42b. It is also recognized that reference 70 between prisms 66 and 68 can be sized relative to index 64 so neither prism 66 nor prism 68 will divert ray 54 when index 64 is incident on reference 70. In this case no signal is created when the microscope 10 is in the focused condition. Regardless of how the out-of-focus condition is indicated, whenever such a condition is established, appropriate means are activated by an error signal to move object 32 or objective lens 30 to cause index 64 to be incident on reference and eliminate the error signal to bring microscope 10 into focus.

In the arrangement of elements for photo detector 76 as shown in FIG. 6, optical fibers 40a and 40b have respective ends juxtaposed to establish reference 70. Their opposite ends are operatively connected respectively with photomultiplier tubes 42a and 42b. With this arrangement, as index 64 in reflected ray 54 is optically shifted from its focus position as shown in FIG. 4, ray 54 and index 64 will be passed through a particular optical fiber 40a or 40b. For instance, index 64 can be passed through either optical fiber 40a to photomultiplier tube 42a or through optical fiber 40b to excite photomultiplier tube 42b. In line with the logic previously discussed, once either photomultiplier tube 42a or 42b has been excited, a signal is passed through associated circuitry 44 to stepper motor 46 to raise or lower stage 48 and bring object 32 into a position where index 64 in reflected ray 54 is moved in a direction toward reference 70 to bring object 32 into focus.

FIG. 3 shows an alternate embodiment of the present invention in which an offset elliptical reflector 62 is incorporated. As envisioned by the alternate embodiment, the offset elliptical reflector 62 provides a means to further concentrate the light energy from light source 18 along optical path 50. Also, the indexing of the invisible component of light can be facilitated by the placement of a filter 60 behind condenser lens 20 which will block the positioning component but pass the viewing component. In all other important respects, the alternate embodiment illustrated in FIG. 3 operates in exactly the same manner as the preferred embodiment illustrated in FIG. 2 and discussed previously.

Figure 7:
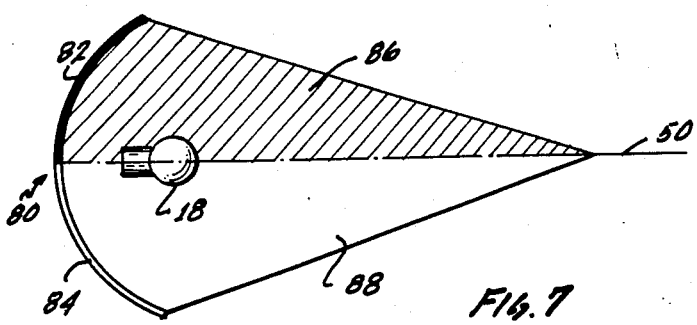
FIG. 7 is an alternate embodiment of a light reflector which can be used with the present invention.

FIG. 7 shows an optional version of a reflector which can be used for the present invention. As shown in FIG. 8 this version comprises a reflector 80 having a reflective section 82 which reflects infrared light from source 18 and a transmissive section 84 which allows infrared light from source 18 to pass therethrough. Thus, all light traveling down optical axis 50 is reflected from reflector 80. The result is that with reflector 80 in the system, the positioning rays (i.e., infrared) are established off axis as indicated by the area 86 in FIG. 7. As also seen in FIG. 7, the portion of the rays 52 from source 18 which are reflected by transmissive section 84 have no infrared component. This portion is indicated in FIG. 7 as the area 88. In this manner an off axis component of light is created which can be used as described above to establish an index 64 for providing an automatic means to focus the microscope 10.

As will be appreciated by the skilled artisan, the preferred embodiment and the alternate embodiment can function with a positioning component of invisible light in either the infrared range or the ultraviolet range. Accordingly, filters 56 and 60 and occluder 58 may be selected to be IR filters or ultraviolet filters according to the particular illuminating source used. As appreciated by the skilled artisan, the various components of the optical system can also be appropriately selected to be compatible with the illumination source. Further, it will be understood by the skilled artisan that in all embodiments of the present invention, visible light can be used as the positioning rays and invisible light used for the viewing rays. This reversal of roles can be easily accomplished by appropriate changes in the filters in the system and by incorporating equipment well known in the art which can use invisible light to obtain the desired information. This may be a distinct advantage in infrared or ultraviolet microscopy. Also, both the positioning and the viewing rays may be invisible light, or, both the positioning and the viewing rays may be visible light.

It will be further appreciated by the skilled artisan that an autofocus system based on the principles disclosed above may be incorporated using transmitted light rather than reflected light. It will be understood that proper arrangement of elements will provide for such a system. In all important respects, the optical arrangements for a transmitted light autofocus system will function in the same manner as previously discussed for the preferred embodiment.

While the particular autofocus arrangements for microscopes as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as defined in the appended claims.

I claim:

1. An arrangement for automatically focusing a microscope being used to view an object which comprises in sequence along a single optical axis:

an illumination source providing light having a first component and a second component;
   a collector;
   an aperture stop;
   a filter positioned at said aperture stop to confine said first component to a portion of said aperture;
   a field stop;
   an occluder positioned at said field stop, said occluder providing an index of said first component on one side of said optical axis and being transparent to said second component;
   means for imaging said occluder on the object from where said index is transferred to the other side of said optical axis;
   a microscope objective spaced from said object;
   means to establish a predetermined reference for said index corresponding to a focused condition for said microscope;
   means for detecting the variation of said index from said predetermined reference and generating an error signal in response to the variation; and
   means associated with said detecting means for adjusting the spacing between said microscope objective and the object to minimize the error signal for focusing the microscope.

2. The arrangement as recited in claim 1 wherein said filter confines said first component to a portion of said aperture not exceeding one-half of said aperture.

3. The arrangement as recited in claim 2 wherein said detecting means comprises:

a first photomultiplier tube;
   a second photomultiplier tube;
   an image splitter for diverting said index toward said first photomultiplier tube or said second photomultiplier tube according to where said index strikes said image splitter and means to generate said error signal indicating an out-of-focus condition whenever said index is incident on only one of said photomultiplier tubes.

4. The arrangement as recited in claim 3 wherein said image splitter comprises a first prism and a second prism juxtaposed to define a reference therebetween and said first and second prisms divert said index respectively toward said first and second photomultiplier tubes.

5. The arrangement as recited in claim 4 wherein the area of said reference is larger than the area of said index.

6. An arrangement as recited in claim 5 wherein said first light component comprises rays of infrared light energy.

7. An arrangement as recited in claim 5 wherein said first light component comprises rays of ultraviolet light energy.

8. An arrangement as cited in claim 4 wherein said microscope uses incident illumination and said means to image said occluder includes said objective.

9. The arrangement as recited in claim 2 wherein said detecting means comprises a first optical fiber and a second optical fiber having respective ends juxtaposed to establish a reference at their interface and each having their opposite ends respectively connected to a first and a second photomultiplier tube, said first and second photomultiplier tubes generating said error signal to indicate an out-of-focus condition whenever said index is incident on only one of said optial fibers.

10. The arrangement as cited in claim 9 wherein said microscope uses incident illumination and said means to image said occluder includes said objective.

11. An arrangement for automatically focusing a microscope being used to view an object which comprises in sequence along a single optical axis:
    an illumination source having a visible component and an invisible component and optically coupled with an offset elliptical reflector to provide increased energy to the light beamed along the optical path of said optical axis;
    a collector;
    an aperture stop;
    a filter positioned at said aperture stop to confine said invisible component to a portion of said aperture;
    a field stop;
    an occluder positioned at said field stop, said occluder providing an index of invisible light on one side of said optical axis and being transparent to the remaining light;
    means comprising a microscope objective spaced from said object for imaging said occluder on the object from where said index is reflected onto the other side of said optical axis;
    means to establish a predetermined reference for said index corresponding to a focused condition for the microscope;
    means for detecting the variation of said index from said predetermined reference and generating an error signal in response to the variation; and
    means associated with said detecting means for adjusting the spacing between said microscope objective and the object to minimize the error signal for focusing the microscope.

12. The arrangement as recited in claim 11 wherein said filter confines said invisible component to a portion of said aperture not exceeding one-half of said aperture.

13. The arrangement as recited in claim 12 wherein said detecting means comprises:
    a first photomultiplier tube;
    a second photomultiplier tube;
    an image splitter for diverting said index toward said first photomultiplier tube or said second photomultiplier tube according to where said index strikes said image splitter and means to generate said error signal indicating an out-of-focus condition whenever said index is incident on only one of said photomultiplier tubes.

14. The arrangement as recited in claim 13 wherein said image splitter comprises a first prism and a second prism juxtaposed to define a reference therebetween and said first and second prisms divert said index respectively toward said first and second photomultiplier tubes.

15. The arrangement as recited in claim 14 wherein the area of said reference is larger than the area of said index.

16. An arrangement as recited in claim 15 wherein said invisible light component comprises rays of infrared light energy.

17. An arrangement as recited in claim 15 wherein said invisible light component comprises rays of ultraviolet light energy.

18. The arrangement as recited in claim 12 wherein said detecting means comprises a first optical fiber and a second optical fiber having respective ends juxtaposed to establish a reference at their interface and each having their opposite ends respectively connected to a first and a second photomultiplier tube, said first and second photomultiplier tubes generating said error signal to indicate an out-of-focus condition whenever said index is incident on only one of said optial fibers.

* * * * *